(12) United States Patent
Spengler

(10) Patent No.: US 6,214,157 B1
(45) Date of Patent: Apr. 10, 2001

(54) VEHICLE TRIM COMPONENT HAVING TWO-PART COVER MATERIAL, AND METHOD AND APPARATUS FOR PRODUCING THE SAME

(75) Inventor: Gerhard Spengler, Frankfurt (DE)

(73) Assignee: R + S Technik, Offenbach am Main (DE)

(*) Notice: Subject to any disclaimer, the term of this patent is extended or adjusted under 35 U.S.C. 154(b) by 0 days.

(21) Appl. No.: 09/176,356

(22) Filed: Oct. 21, 1998

(51) Int. Cl.$^7$ .............................. B60R 13/02; B32B 3/06; B32B 7/12

(52) U.S. Cl. ...................... 156/304.6; 156/304.1; 180/90; 296/39.1; 296/70; 296/146.7; 52/716.3; 52/716.5; 264/296; 264/322

(58) Field of Search .................... 296/39.1, 39.3, 296/70, 146.7, 214; 180/90; 156/304.1, 304.3, 304.6; 52/716.3, 716.5, 796.1, 578; 264/294, 296, 322, 324, 510

(56) References Cited

U.S. PATENT DOCUMENTS

| | | |
|---|---|---|
| 4,861,543 | 8/1989 | Rafferty . |
| 5,304,273 | * 4/1994 | Kenrick et al. .................. 156/219 |
| 5,413,661 | 5/1995 | Spengler et al. . |
| 5,573,617 | * 11/1996 | Franck et al. ................... 156/196 |
| 5,709,925 | 1/1998 | Spengler et al. . |

FOREIGN PATENT DOCUMENTS

| | | |
|---|---|---|
| 4327551 | 2/1995 | (DE) . |
| 0348357 | 12/1989 | (EP) . |
| 0372355 | 6/1990 | (EP) . |
| 0683030 | 11/1995 | (EP) . |
| 2176743 | 1/1987 | (GB) . |
| WO97/40980 | 11/1997 | (WO) . |

* cited by examiner

Primary Examiner—Robert Canfield
(74) Attorney, Agent, or Firm—W. F. Fasse; W. G. Fasse

(57) ABSTRACT

A trim component (1) for an automobile or the like includes a substrate (2) and two different cover materials such as a cover film (3) and a cover cloth (4). The two cover materials (3, 4) are not spliced together, but instead are independently adhesively bonded directly onto the substrate (2) by a hot-melt contact adhesion. The junction (7) is received in a valley (6) of the substrate (2) that is pinched closed during molding of the trim component. For forming the trim component, a molding apparatus includes a horizontally movable pinching stamp (13) that forms a pinching gap (16) relative to a protruding edge (11A) of a fixed mold tool (11). A tucking blade (22) presses the substrate and junction (7) of the cover sheets into the pinching gap (16), and is then retracted while the pinching stamp (13) pinches closed the pinching gap (16). This forms a tightly closed valley (6) in the substrate (2) with the junction (7) cleanly pinched therein, without leaving a gap and without requiring a trim strip to be applied thereon.

16 Claims, 4 Drawing Sheets

VEHICLE TRIM COMPONENT HAVING TWO-PART COVER MATERIAL, AND METHOD AND APPARATUS FOR PRODUCING THE SAME

FIELD OF THE INVENTION

The invention relates to a trim component and especially an interior trim panel for a motor vehicle, wherein the decorative covering of the trim component includes two different cover materials. The invention further relates to a method and an apparatus for producing such a trim component having a two-part cover material.

BACKGROUND INFORMATION

In the automotive industry, it has become known to use interior trim components such as interior door panels, dashboards, and the like having a decorative covering including two different cover materials on the same trim component. Such a trim component having a two-part cover material is desired by consumers, for example to achieve a "two-tone effect" in which the two different cover materials have different colors, or a high value or "luxury effect" in which the two different cover materials are different types of materials such as a decorative cover film and a decorative cloth, or in which the different cover materials have different degrees of "soft touch" padding or the like.

In order to make such vehicle trim components having two-part cover materials, it has conventionally been the practice to splice together the two different cover materials before applying the spliced cover sheet onto the substrate of the trim component. The splicing of the two different cover materials has conventionally been carried out by thermal welding, adhesive bonding, or stitching. After the two different cover materials have been spliced together in such a manner, it is generally necessary to hide or cover the splice line in order to hide the stitching or any adhesive overspill or the like. This is conventionally achieved by applying a trim strip, such as a strip of plastic, chrome, wood or the like, over the splice line on the finished trim component. Alternatively, it has been attempted to press the splice line into a groove provided in the substrate in order to hide the splice line in this manner.

The above described conventional practices and the resulting trim component having a two-part cover material suffer many disadvantages, including the following. The preliminary process of splicing together the two different cover materials involves extra processing and handling steps, which translates into increased costs and a greater likelihood of defective parts leading to a higher reject rate. Furthermore, the application of a trim strip to hide the splice line on the finished door panel, dashboard or the like requires extra steps and extra materials, which again lead to higher costs and higher defect rates.

Most importantly, the previously known methods for making a trim component having a two-part cover material require extreme precision in forming the splice between the two different cover materials, then aligning the spliced two-part cover material onto the substrate of the trim component, and aligning the splice line with the groove provided in the substrate and/or aligning the splice trim strip with the splice line. It has been found in practice that this high degree of precision cannot be reliably attained, and as a result, the splice line is left at least partially visible in the finished trim component, i.e. the splice line protrudes out of the groove in the substrate or protrudes from under the splice trim strip. This leads to an unacceptably high reject rate of the finished trim components.

Moreover, in the operation for pressing the splice line into a groove provided in the substrate, it has been necessary to preform the groove in the substrate, which requires extra processing steps, and it has been necessary to make the groove wide enough to provide a sufficient tolerance range so that a tucking blade can press the splice line of the cover material down into the groove and then be retracted. In other words, the groove in the substrate conventionally has to be wide enough to allow for the thickness of the two layers of the cover material on both sides of the splice and for the thickness of the tucking blade that presses the cover material into the groove. After the tucking blade is retracted, however, a gap necessarily remains where the tucking blade had been pressed in. In any event, the result in the finished trim component has been unsatisfactory, because of the above mentioned defects in alignment of the splice line with the groove, but also because of the width of the conventional groove, which does not have a "closed" and "crisp" appearance.

SUMMARY OF THE INVENTION

In view of the above, it is an object of the invention to provide a trim component especially for the interior of a motor vehicle, that has a decorative covering including at least two different cover materials in which the two cover materials are not pre-spliced together, and the junction line is hidden in a groove or valley of the substrate without requiring a splice trim strip. It is a further object of the invention to provide a method and an apparatus for producing such a trim component, which avoid the need for pre-splicing operations and which require a significantly lower degree of precision in aligning the junction of the two cover materials with the substrate. The invention further aims to avoid or overcome the other disadvantages of the prior art, and to achieve additional advantages, as apparent from the present description.

The above objects have been achieved in a trim component according to the invention, including a substrate, and a decorative covering including two different cover sheets, which may include cover sheets having different colors and/or cover sheets made of different materials, such as a cloth cover sheet and a film cover sheet. The film may be a synthetic leatherette film, or a vinyl film, or a thermoplastic polyolefin (TPO) film, for example. The cover sheet may include a polyolefin foam or film backing for achieving hot-melt bonding. The substrate preferably comprises natural fibers and a polyolefin material, and especially polypropylene. An example of a preferred material is a multi-layered substrate material available under the trademark "LOPREFIN" from R+S Stanztechnik GmbH of Offenbach, Germany.

The substrate includes a valley formed therein, with a junction of the two different cover sheets pressed into this valley. The two different cover sheets are not pre-spliced to each other, but instead are simply pressed into the valley as it is being formed. Particularly, the valley is formed by pinching the substrate material onto the junction area of the two different cover sheets as the substrate is being molded and laminated with the cover sheets.

The cover sheets are laminated and adhered onto the substrate due to the hot-melt adhesion effect provided by the surface of the hot substrate during the forming process. Namely, when the substrate material is heated for laminating, the polypropylene therein is softened and at least partially melted to provide a tacky adhesion for bonding the two cover sheets onto the substrate, and also into the valley of the substrate. Thus, no additional stitching or adhesive is necessary for joining the two cover sheets to each other or for bonding the cover sheets onto the substrate.

The above objects have further been achieved by a method according to the invention, wherein the two different cover sheets are separately laid onto a preheated substrate sheet, whereby the cover sheets adhere in a tacky manner onto the preheated substrate, by a hot-melt adhesive effect provided by the hot polypropylene. The bordering edges of the cover sheets forming the junction therebetween are then pressed down by a tucking blade from above so as to form the valley in the substrate and push the junction area of the cover sheets into the valley. Next, the valley is pinched together from below, while the tucking blade is retracted from above, so as to pinch the valley closed, whereby the junction of the two different cover sheets is held in the pinched valley.

By pinching the substrate in this manner, while pressing down from above with a tucking blade, and continuing and completing the pinching as the tucking blade is removed, it is ensured that the valley is pinched closed without leaving any gap or space resulting from the width or thickness of the tucking blade. The pinching securely adhesively fixes the bordering edges of the two different cover sheets onto the substrate in the valley, due to the tacky hot-melt adhesive effect of the hot substrate sheet, so that it is unnecessary to splice or bond the bordering edges to each other.

Since the pinching gap is initially much wider than the finished pinched valley, the degree of precision required for aligning or registering the junction line of the two different cover sheets over the pinching gap is significantly reduced. Namely, it is simply necessary to align the junction of the two cover sheets with the initially wide open gap in the molding tools used for forming the pinched valley, and when this gap is closed or pinched, the finished pinched valley is much narrower than the originally provide gap. Thus, the wider width of the initially open gap contributes to a larger tolerance for positioning the junction line of the two cover sheets, while the narrower closed gap defines the width of the finished valley pinching the cover sheet bordering edges therein. Moreover, the depth of the pinching gap also contributes to the tolerance range for ultimately hiding the junction line of the two different cover sheet materials. By making the gap as deep and as wide as required in the initial open state of the molding tools, it is simple to provide a large tolerance for the proper positioning of the two different cover sheets onto the substrate and then positioning the substrate onto the mold, while still ensuring that the finished trim component will have a completely closed or pinched valley, with the junction of the two different cover sheets completely hidden within this valley. The resulting valley has a clean and crisp closed appearance, because the inner width of the substrate valley is not greater than the sum of the thicknesses of the two cover sheets overlapped and received in the pinched valley.

The above objects have still further been achieved in a forming mold apparatus according to the invention, including a lower mold section and an upper mold section that are generally movable vertically relative to each other. The molding apparatus further includes a slip frame that holds the edges of the substrate sheet with the cover sheets placed thereon, and transports this prelaminated sheet into the mold and holds it under proper tension during the molding operation. The lower mold section includes a fixed base mold or fixed tool segment, a vertically movable primary lower mold stamp that is vertically movable relative to the fixed tool segment, and a pinching stamp that is horizontally movable relative to the fixed tool segment and that forms a pinching gap between a protruding edge or rim of the pinching stamp and a protruding edge or rim of the fixed tool segment. The upper mold section includes an upper primary mold stamp, a tucking blade that is vertically movable relative to the upper primary mold stamp, and an edge crimping ring that is vertically movable relative to the upper primary mold stamp.

The lower primary mold stamp cooperates with the upper primary mold stamp to form the major contours of the finished trim component therebetween. The tucking blade of the upper mold section cooperates with the pinching gap formed between the fixed tool segment and the horizontally movable pinching stamp of the lower mold section in order to form the pinched valley in the trim component, with the junction between the two different cover sheets tucked down into this closed pinched valley. The vertically movable edge crimping ring cooperates with a corresponding edge of the pinching stamp of the lower mold section to form a closed crimped edge around the outer contour of the trim component.

BRIEF DESCRIPTION OF THE DRAWINGS

In order that the invention may be clearly understood, it will now be described in connection with an example embodiment, with reference to the accompanying drawings, wherein.

DETAILED DESCRIPTION OF PREFERRED EXAMPLE EMBODIMENTS AND OF THE BEST MODE OF THE INVENTION

Figure 1:
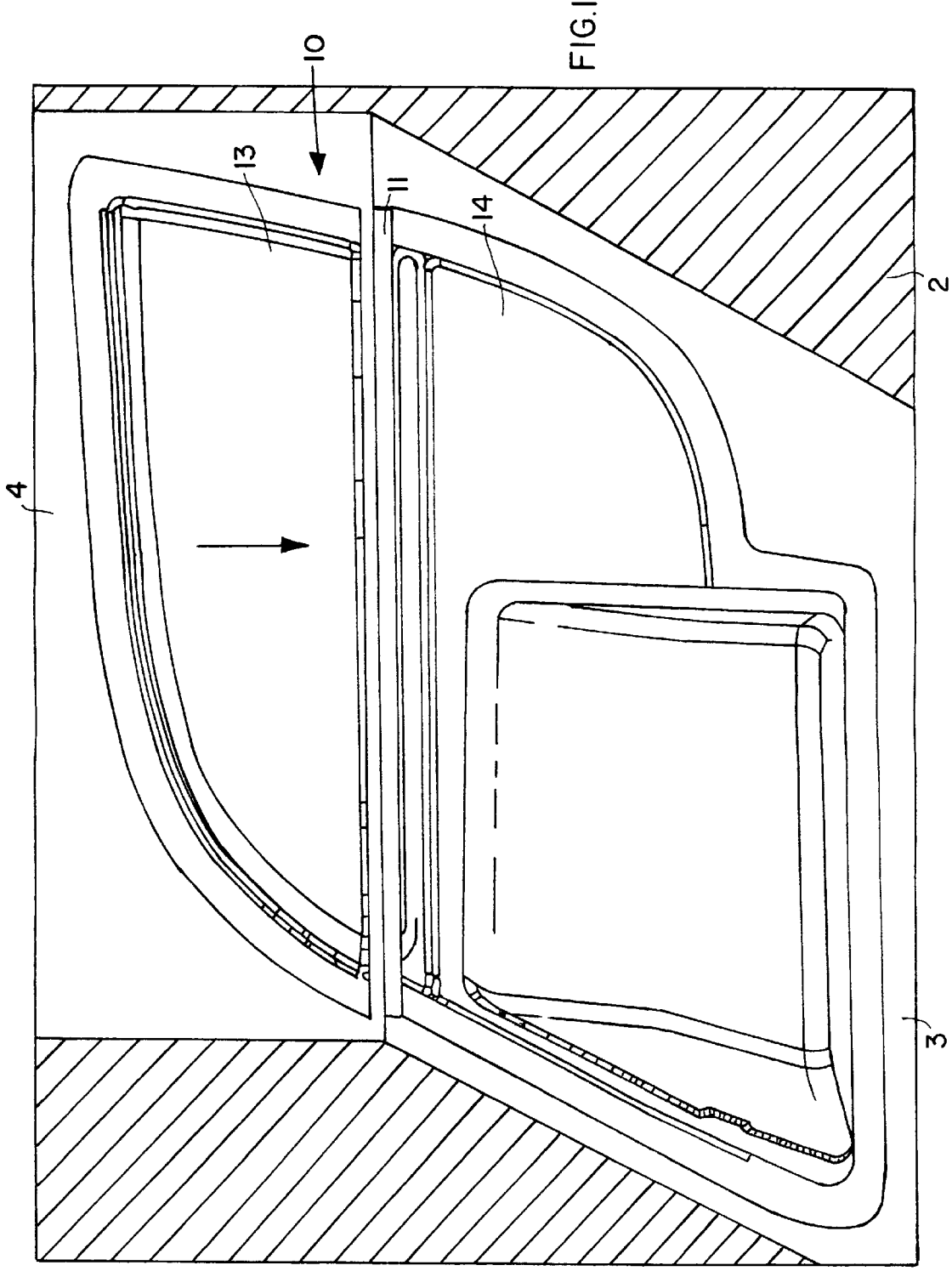
FIG. 1 is a schematic top plan view of a pre-laminated sheet including cover sheets adhered onto a substrate, superimposed on a plan view of the lower mold of an apparatus according to the invention.
Figure 4:
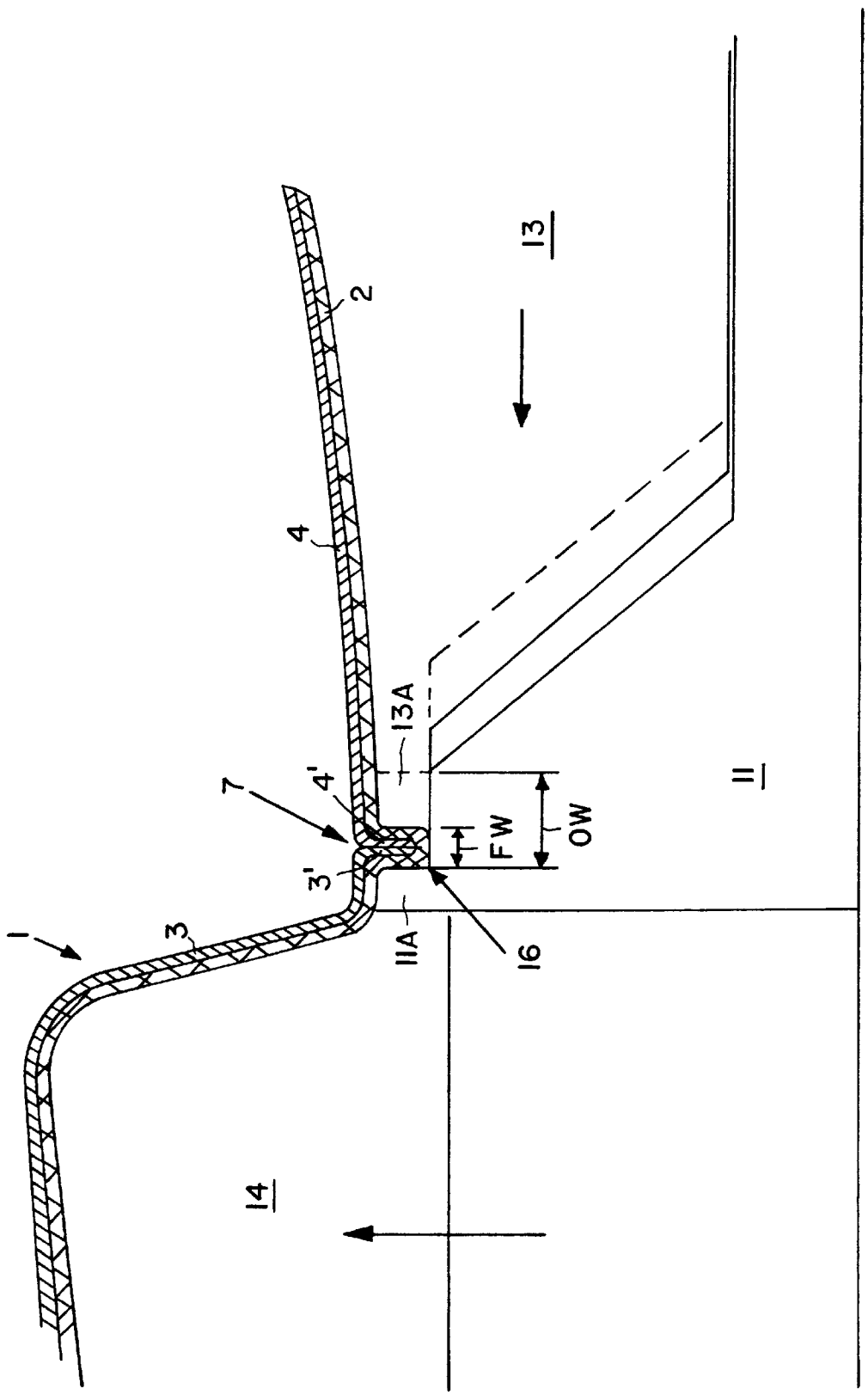
FIG. 4 is an enlarged detailed sectional view of a portion of FIG. 3, to illustrate the pinching area of the molding apparatus.

With reference to FIGS. 1 and 4, an example of a trim component 1 according to the invention is an interior door trim panel for an automobile, comprising a substrate 2 with two different cover sheets, namely a cover film 3 and a cover cloth 4, applied thereon. The two cover sheets, namely the film 3 and the cloth 4 are not pre-spliced together, but rather come together with their respective bordering edges 3' and 4' arranged butting together edge-to edge junction area 7, which is received and pinched in a valley 6 formed in the substrate 2. The film 3 and the cloth 4 are directly adhesively bonded onto the substrate 2, without using any additional adhesive or the like. The cloth 4 is, for example, a synthetic woven fabric cloth which preferably includes a polyolefin. The film 3 is, for example, a thermoplastic polyolefin (TPO) film. The substrate 2 is preferably a substrate material comprising natural fibers such as kenaf plant fibers and a polyolefin matrix such as polypropylene. The substrate is most preferably a multi-layered substrate, whereby the different layers may have different compositions. The preferred polyolefin material of the cloth 4 and the film 3 is directly bonded onto the polypropylene of the substrate 2 by a hot-melt adhesive effect. Because of the pinched valley 6, there is no need for, and the trim component 1 does not include, any adhesive or stitching that connects together the bordering edges 3' and 4' of the cover film 3 and the cloth 4, or a splice trim strip applied over the junction area 7.

An example method and apparatus for producing the present trim component 1 will now be described with reference to FIGS. 1 to 4. In preliminary steps not shown in the drawings, the substrate sheet 2 is pre-heated and pre-compressed in a heating press, to the required density and to the required temperature for achieving a hot-melt adhesion onto the cover sheets as will be described below. The cover film 3 and the cover cloth 4 are separately laid onto the pre-heated and pre-compressed substrate sheet 2, whereby the hot-melt adhesive effect of the hot polypropylene of the substrate causes a tacky adhesive bonding of the film 3 and the cloth 4 onto the substrate sheet 2. In order to increase the adhesive bonding if necessary, the pre-laminate may again be pressed so as to firmly bond the cover sheets 3 and 4 onto the substrate 2.

The resulting pre-laminated sheet is held around its edges by a slip frame 18, which then transports the pre-laminated sheet into position between a lower mold 10 and an upper mold 20. Since the two cover sheets 3 and 4 are already firmly fixed in position and bonded on the substrate 2, there is no need to provide a separate transport and positioning frame for the cover sheets 3 and 4.

The position of the cover sheets 3 and 4 on the substrate 2 is fixed when the cover sheets 3 and 4 are laid and adhered onto the substrate 2. Thus, the proper registration of the cover sheets 3 and 4 on the substrate 2 is not subject to variations in the further processing of the prelaminated sheet. Namely, when the substrate 2 is properly positioned by the slip frame 18, the cover sheets 3 and 4 and the junction area 7 therebetween are necessarily also properly positioned.

FIG. 1 represents a schematic top view onto the lower mold 10 with the pre-laminated sheet of the cover film 3 and cloth 4 adhered onto the substrate sheet 2 superimposed thereon. In FIG. 1, the components of the lower mold 10 are shown in a ghost image below the prelaminated sheet for purposes of illustration.

Figure 2:
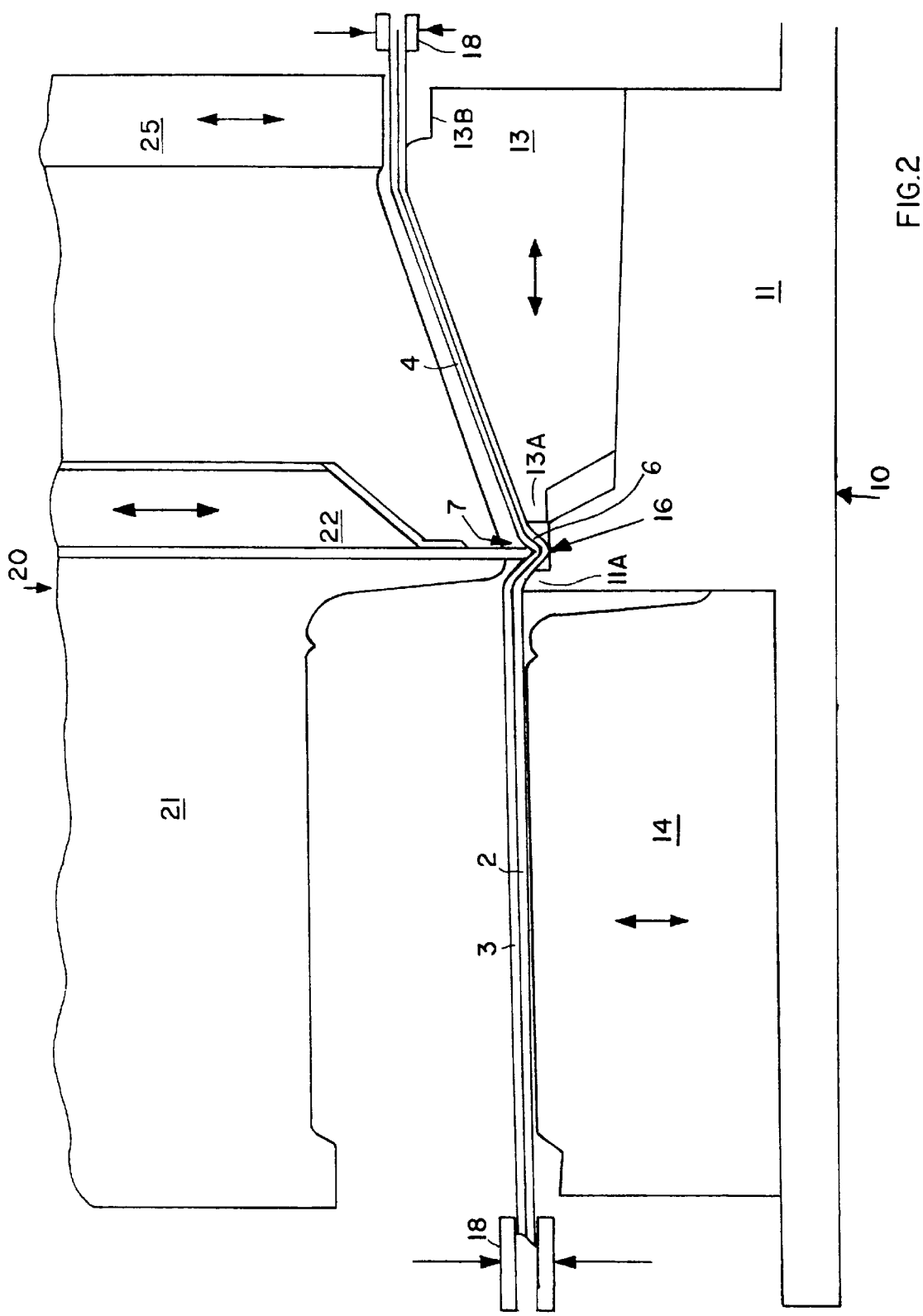
FIG. 2 is a sectional schematic side view of a molding apparatus according to the invention, at a first stage of the molding process.

Referring to FIG. 2, the prelaminated sheet including the cover sheets 3 and 4 on the substrate 2 is held in position by the slip frame 18 between the lower mold 10 and the upper mold 20. As a first molding step, the upper mold 20 in general is moved down into position against the lower mold 10. In a first possible sequence of steps, the lower primary mold stamp 14 is first moved up against the upper primary mold stamp 21 so as to mold and form the major portion of the trim component including the cover film 3 between the two mold stamps 14 and 21, and thereafter the tucking blade 22 is operated as described below. In an alternative, preferred sequence of molding steps, however, the first molding contact or closed portion of the molding tools is formed by moving down the tucking blade 22 into a pinching gap 16 formed in the lower mold 10. By carrying out this step first, the proper location and holding of the junction area 7 of the cover film 3 and the cover cloth 4 into the pinching gap 16 is ensured, without being affected by any tension applied to the pre-laminated sheet by the molding operation carried out between the lower primary mold stamp 14 and the upper primary mold stamp 21.

The lower mold 10 includes a fixed tool segment 11 having a protruding edge or rim 11A, and a pinching stamp 13 having a protruding edge or rim 13A that is horizontally movable relative to the fixed tool segment 11. The pinching gap 16 is formed between the protruding edge 11A of the fixed tool segment 11 and the protruding edge 13A of the pinching stamp 13. Initially as shown in FIG. 2, the pinching gap 16 has a relatively wide width, i.e. this gap 16 is opened, because the horizontally movable pinching stamp 13 is initially retracted toward the right and has not yet been driven toward the left. Thus, when the tucking blade 22 presses the junction area 7 of the pre-laminated sheet down into the pinching gap 16 and correspondingly forms the valley 6 in the substrate, there is initially a rather wide play area or tolerance range within which it is still ensured that the junction 7 itself of the film 3 and the cloth 4 will be received in the valley 6 within the pinching gap 16. For this reason, the slip frame 18 does not need to transport and hold the prelaminated sheet with extreme precision, but merely with sufficient precision to locate the junction 7 over the wide open pinching gap 16.

Figure 3:
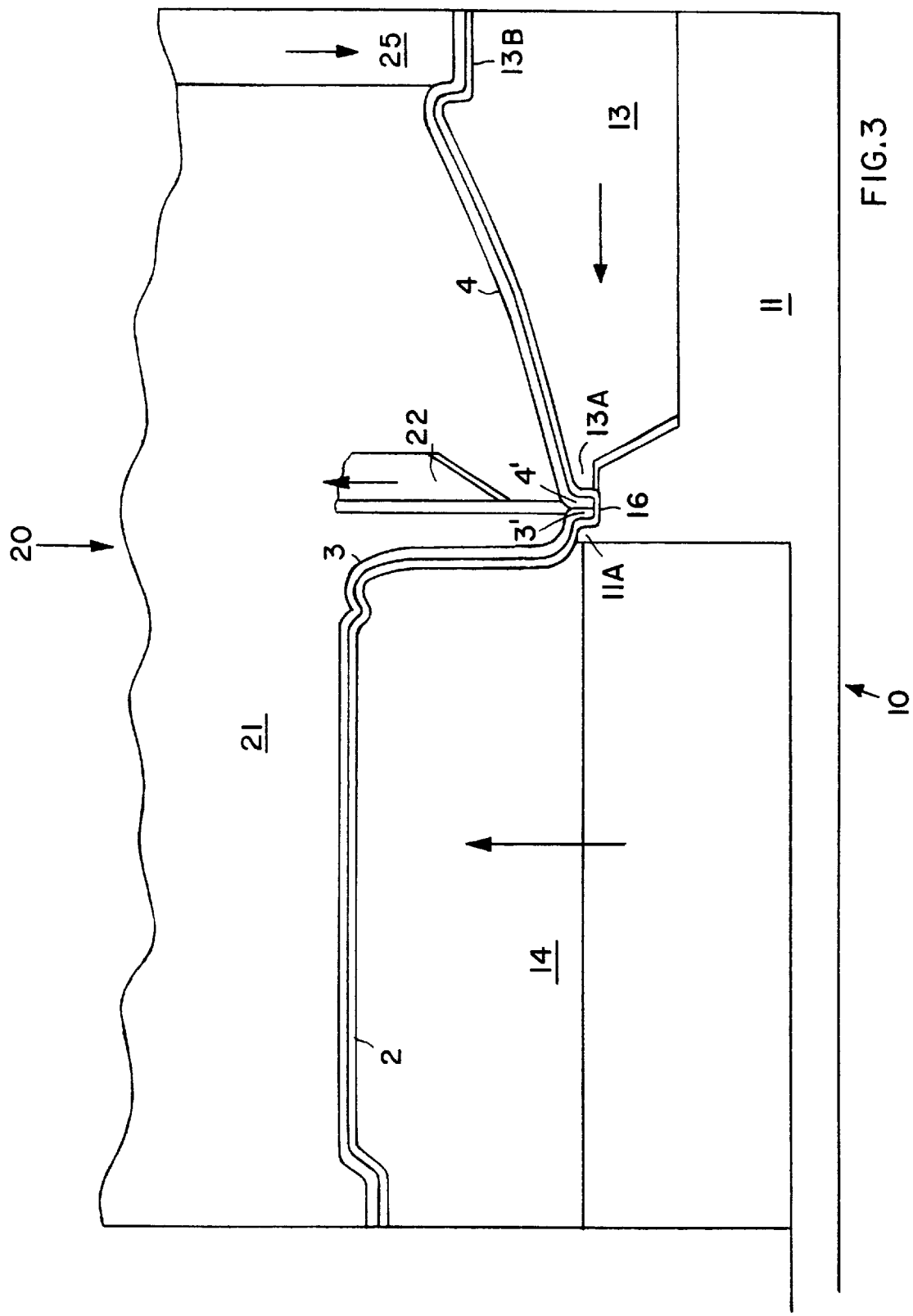
FIG. 3 is a view similar to that of FIG. 2, but showing the molding apparatus in a subsequent stage of the molding process.

FIG. 3 shows a subsequent stage of the molding process. The pinching stamp 13 has been pressed toward the left so as to close the pinching gap 16, i.e. so as to pinch the valley 6 of the substrate 2 closed around the junction area 7, between the protruding edge 13A of the pinching stamp 13 and the protruding edge 11A of the fixed tool segment 11. As the pinching stamp 13 progresses toward the left, the tucking blade 22 is retracted upward, and the pinching stamp 13 completes its pinching motion toward the left after the blade 22 has been fully retracted. As a result, it is possible to completely pinch closed the valley 6 in the substrate 2, with the bordering edges 3' and 4' of the film 3 and the cloth 4 pinched tightly into the closed valley 6, between the protruding edge 13A and the protruding edge 11A.

Once the pinching operation by the pinching stamp 13 has been completed or substantially completed, the lower mold stamp 14 is pressed upward against the upper mold stamp 21, while the upper mold stamp 21 simultaneously presses downward against the pinching stamp 13. In this manner, the portion of the trim component 1 provided with the cover film 3 is molded and laminated between the lower mold stamp 14 and the upper mold stamp 21, while the portion of the trim component 1 provided with the cover cloth 4 is molded and laminated between the upper mold stamp 21 and the pinching stamp 13. At this stage also, the edge crimping ring 25 is moved downward, so as to crimp the outer perimeter edge of the trim component 1 between the crimping ring 25 and the outer rim 13B of the pinching stamp 13.

As seen in FIG. 3 and in the detail view of FIG. 4, the upper surface contour of the lower mold stamp 14, the fixed tool segment 11 and the pinching stamp 13 forming the lower mold 10 substantially corresponds to the bottom surface contour of the upper mold stamp 21 and the edge crimping ring 25. This surface contour between the lower mold 10 and the upper mold 20 also defines the contour of the finished trim component 1.

In the detail view of FIG. 4, the pinching stamp 13 is shown in its left-most pinching position with solid lines, and is shown in its right-most open position with dashed lines. The closed or pinched valley 6 in the substrate 2 is also clearly evident, with the junction 7 of the bordering edges 3' and 4' of the cover film 3 and the cloth 4 received completely within the groove or valley 6. As can be seen in the illustration, the finished junction area 7 is a clean or crisp transition between the cover film 3 and the cloth 4, without a gap, opening, or necessity of providing a trim strip therebetween. Thus, the finished width FW of the pinched valley 6 is much less than the open width OW of the pinching gap 16 formed between the protruding edge 13A of the pinching stamp 13 and the protruding edge 11A of the fixed tool segment 11 when the pinching stamp 13 is in its initial right-hand position. As explained above, it is the open width OW of the pinching gap 16, as well as the depth of the gap, that defines the tolerance range within which the junction 7 may be positioned for reliably receiving and enclosing the junction 7 in the finished pinched valley 6.

Once the molding apparatus is in the state shown in FIGS. 3 and 4, this state is maintained for a brief cooling time, for which the molds are preferably liquid-cooled. This preliminary cooling rigidifies the substrate 2 sufficiently to hold and maintain the pinched form of the valley 6 with the junction 7 therein, after the mold is opened as follows. To open the mold, the edge crimping ring 25 is retracted upward, and the upper and lower primary mold stamps 21 and 14 are moved back to their initial positions, while the pinching mold 13 is moved back to the right after its motion is no longer blocked by the engagement of the edge crimping ring 25. Once the mold is open, the molded trim component can be removed and allowed to completely cool. The cooling rigidifies the substrate 2 so as to hold the tightly pinched form of the valley 6, and to make the overall component 1 form-stable, i.e. sufficiently rigid to maintain the molded configuration thereof.

The inventive trim components can be used in motor vehicles in the broadest sense, for example including automobiles, trucks, railroad cars, aircraft, recreational vehicles, and boats, and also in numerous other applications, such as in mobile homes and pre-manufactured housing. Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A trim component comprising:
   a substrate with a valley therein,
   a first cover sheet adhesively bonded by mutual hot-melt adhesion onto a first surface area of said substrate, and
   a second cover sheet that is different from said first cover sheet and that is adhesively bonded by mutual hot-melt adhesion onto a second surface area of said substrate, wherein:
   said first and second surface areas border each other along said valley,
   said first and second cover sheets respectively have first and second bordering edges that extend into and border each other along said valley,
   said first and second bordering edges are not spliced to each other and have not been pre-spliced to each other and have not been overlapped with each other,
   said valley of said substrate is pinched closed with said first and second bordering edges butting together edge-to-edge therein,
   no additional adhesive is provided between said cover sheets and said substrate for adhesively bonding said cover sheets onto said substrate, and
   said substrate comprises natural plant fibers and a hot-meltable synthetic.

2. The trim component according to claim 1, being a motor vehicle interior trim component.

3. The trim component according to claim 1, wherein said first and second cover sheets respectively have first and second different colors.

4. The trim component according to claim 1, wherein said first and second cover sheets respectively comprise different cover materials.

5. The trim component according to claim 1, wherein said first cover sheet is a cover film and said second cover sheet is a cover fabric.

6. The trim component according to claim 1, wherein said substrate comprises a composite including said natural plant fibers and said hot-meltable synthetic which comprises a polyolefin matrix, said first and second cover sheets each respectively comprise a polyolefin, and said cover sheets are adhesively bonded onto said substrate by said mutual hot-melt adhesion being thermal fusion bonding of said polyolefin matrix of said substrate with said respective polyolefin of each said cover sheet.

7. The trim component according to claim 1, wherein an inner width of said valley in which said first and second bordering edges of said first and second cover sheets are received is no greater than the sum of the respective thicknesses of said first and second cover sheets and there is no remaining gap therein.

8. The trim component according to claim 7, wherein said substrate is sufficiently rigid to be form-stable and maintain said valley in a pinched closed state, without any device clampingly holding said valley in said pinched closed state.

9. The trim component according to claim 7, excluding a trim cover strip applied over said cover sheets along said valley.

10. The trim component according to claim 1, excluding stitching and excluding adhesive interconnecting said first and second bordering edges of said first and second cover sheets.

11. A method of making the trim component according to claim 1, said method comprising the following steps:
   a) heating a substrate sheet;
   b) laying a first cover sheet onto a first surface area of said heated substrate sheet, and laying a second cover sheet that is different from said first cover sheet onto a second surface area of said heated substrate sheet, such that respective first and second bordering edges of said first and second cover sheets border contiguously along each other along a border line, to form a pre-laminated sheet;
   c) positioning said pre-laminated sheet relative to a tucking blade and a pinching mold gap that are aligned and adapted to cooperate with each other, such that said substrate sheet faces said pinching mold gap and said cover sheets face said tucking blade with said border line aligned within an open gap width of said pinching mold gap;
   d) pushing said tucking blade against said pre-laminated sheet to push said substrate sheet and said bordering edges of said cover sheets into said pinching mold gap and thereby form a valley in said substrate sheet with said bordering edges in said valley;
   e) pinching closed said pinching mold gap while retracting said tucking blade, so as to pinch closed said valley in said substrate sheet with said bordering edges therein; and
   f) cooling said pre-laminated sheet after said step e).

12. The method according to claim 11, wherein said substrate sheet is a flat sheet with no groove and no valley therein, in said steps a) and b).

13. The method according to claim 12, wherein said step a) further includes compressing said substrate sheet.

14. The method according to claim 12, wherein said hot-meltable synthetic of said substrate comprises a polyolefin material, and said heating in said step a) is carried out to a sufficient temperature such that said first and second cover sheets become directly fusion bonded onto said substrate sheet due to a hot-melt adhesive effect provided by said polyolefin material of said heated substrate sheet.

15. The method according to claim 11, wherein said first and second cover sheets are separately and independently laid onto said substrate sheet in said step b), and wherein said first and second cover sheets have not been overlapped and have not been connected to each other along said first and second bordering edges prior to said step b).

16. The method according to claim 11, further comprising a step of pressing and molding a remainder of said pre-laminated sheet adjacent said valley.

* * * * *